United States Patent
Smith et al.

(10) Patent No.: US 9,173,522 B2
(45) Date of Patent: Nov. 3, 2015

(54) TABLETOP GRILL

(71) Applicant: Spectrum Brands, Inc., Middleton, WI (US)

(72) Inventors: Jacob D. Smith, Madison, WI (US); Charles A. Nelson, Verona, WI (US); Matthew A. C. Guckenberger, Oconomowoc, WI (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 14/036,745

(22) Filed: Sep. 25, 2013

(65) Prior Publication Data

US 2014/0165850 A1 Jun. 19, 2014

Related U.S. Application Data

(60) Provisional application No. 61/705,563, filed on Sep. 25, 2012, provisional application No. 61/707,546, filed on Sep. 28, 2012.

(51) Int. Cl.
| | | |
|---|---|---|
| *A47J 37/06* | (2006.01) | |
| *A47J 37/07* | (2006.01) | |
| *B23P 11/00* | (2006.01) | |

(52) U.S. Cl.
CPC .......... *A47J 37/0611* (2013.01); *A47J 37/0676* (2013.01); *A47J 37/0709* (2013.01); *B23P 11/00* (2013.01); *A47J 37/06* (2013.01); *Y10T 29/49826* (2015.01)

(58) Field of Classification Search
CPC ... A47J 37/06; A47J 37/0611; A47J 37/0617; A47J 37/0629; A47J 37/0664; H05B 1/0258; H05B 3/30
USPC ........... 99/349, 356, 372, 376, 377, 378, 379; 219/386, 524; 126/39 N
See application file for complete search history.

(56) References Cited

U.S. PATENT DOCUMENTS

| | | | |
|---|---|---|---|
| 6,439,108 B1 * | 8/2002 | Wu ................................ 99/349 |
| 7,109,442 B2 * | 9/2006 | Steinberg et al. ............. 219/386 |
| 7,514,655 B2 * | 4/2009 | Fernandez et al. ............ 219/524 |
| 7,752,958 B2 * | 7/2010 | Cohen et al. .................... 99/375 |
| 8,286,548 B2 * | 10/2012 | Krishnan et al. ................ 99/378 |
| 2004/0261623 A1 * | 12/2004 | Huggler et al. ................. 99/275 |
| 2005/0005777 A1 * | 1/2005 | Steinberg et al. ............... 99/349 |
| 2005/0247210 A1 * | 11/2005 | Ragan ............................ 99/372 |
| 2006/0213373 A1 | 9/2006 | Fernandez et al. |
| 2009/0000490 A1 * | 1/2009 | Krasznai ......................... 99/376 |
| 2013/0112086 A1 * | 5/2013 | Lamont ........................... 99/376 |

OTHER PUBLICATIONS

Extended European Search Report for Application No. 13186026.4, dated Dec. 2, 2013, 5 pages.

* cited by examiner

*Primary Examiner* — Nina Bhat

(74) *Attorney, Agent, or Firm* — Armstrong Teasdale LLP

(57) ABSTRACT

A tabletop grill generally includes a housing, a heating element disposed within the housing, and a grill plate configured to be removably mounted on the housing. The grill plate and the housing are magnetically connectable to retain the grill plate on the housing.

13 Claims, 11 Drawing Sheets

TABLETOP GRILL

CROSS-REFERENCE TO RELATED APPLICATIONS

This application claims the benefit of U.S. Provisional Application No. 61/705,563 filed on Sep. 25, 2012 and U.S. Provisional Application No. 61/707,546 filed on Sep. 28, 2012, which are incorporated by reference herein in their entirety.

BACKGROUND

The present invention relates generally to heating appliances and, more particularly, to a tabletop grill for use in heating a food product.

Many conventional tabletop grills have an upper housing and a lower housing that are connected together via a hinge in a clamshell-type configuration. A grill plate covers each of the housings, and a heating element is disposed within each of the housings for heating the grill plate and, therefore, a food product contacting the grill plate. In some conventional grills, the plates are removable from their associated housings for cleaning. However, the plates are typically removable using a latch mechanism that is susceptible to malfunction or breakage. It would be useful, therefore, to provide a tabletop grill with a simpler and more reliable device for removably mounting the grill plates on the housings.

SUMMARY

In one embodiment, a tabletop grill generally comprises a housing, a heating element disposed within the housing, and a grill plate configured to be removably mounted on the housing. The grill plate and the housing are magnetically connectable to retain the grill plate on the housing.

In another embodiment, a grill plate for a tabletop grill that includes a housing having a magnet device generally comprises a ferromagnetic material configured for making a magnetic connection with the magnet device of the housing.

In yet another embodiment, a tabletop grill generally comprises a bottom grill unit comprising a bottom housing, a bottom reflector pan disposed within the bottom housing, a bottom heating element disposed within the bottom housing, and a bottom grill plate mounted on the bottom housing such that the bottom heating element is situated between the bottom reflector pan and the bottom grill plate. The tabletop grill further comprises a top grill unit comprising a top housing, a top reflector pan disposed within the top housing, a top heating element disposed within the top housing, and a top grill plate mounted on the top housing such that the top heating element is situated between the top reflector pan and the top grill plate. The tabletop grill also comprises a hinge connecting the bottom grill unit to the top grill unit such that the top grill unit is pivotable relative to the bottom grill unit so as to change an orientation of the top grill plate relative to the bottom grill plate. Each of the bottom grill plate and the top grill plate comprises a pair of handles, and each of the handles has a gripping segment, a plurality of spaced-apart alignment segments that define a plurality of gaps, and a ferromagnetic material associated with one of the alignment segments. Each of the bottom housing and the top housing comprises a pair of alignment assemblies each configured for engaging one of the handles. Each of the alignment assemblies has a sleeve, a magnet device loosely disposed within the sleeve, and a plurality of alignment projections projecting from the sleeve each for insertion into one of the gaps of the associated handle such that the magnet device of each alignment assembly magnetically connects to the ferromagnetic material of the associated handle to removably retain each of the grill plates on its respective housing.

In yet another embodiment, a method of assembling a tabletop grill generally comprises providing a housing in which a heating element is disposed. The method further includes magnetically connecting a grill plate to the housing over the heating element.

BRIEF DESCRIPTION

Corresponding reference characters indicate corresponding parts throughout the several views of the drawings.

DETAILED DESCRIPTION

Figure 1:
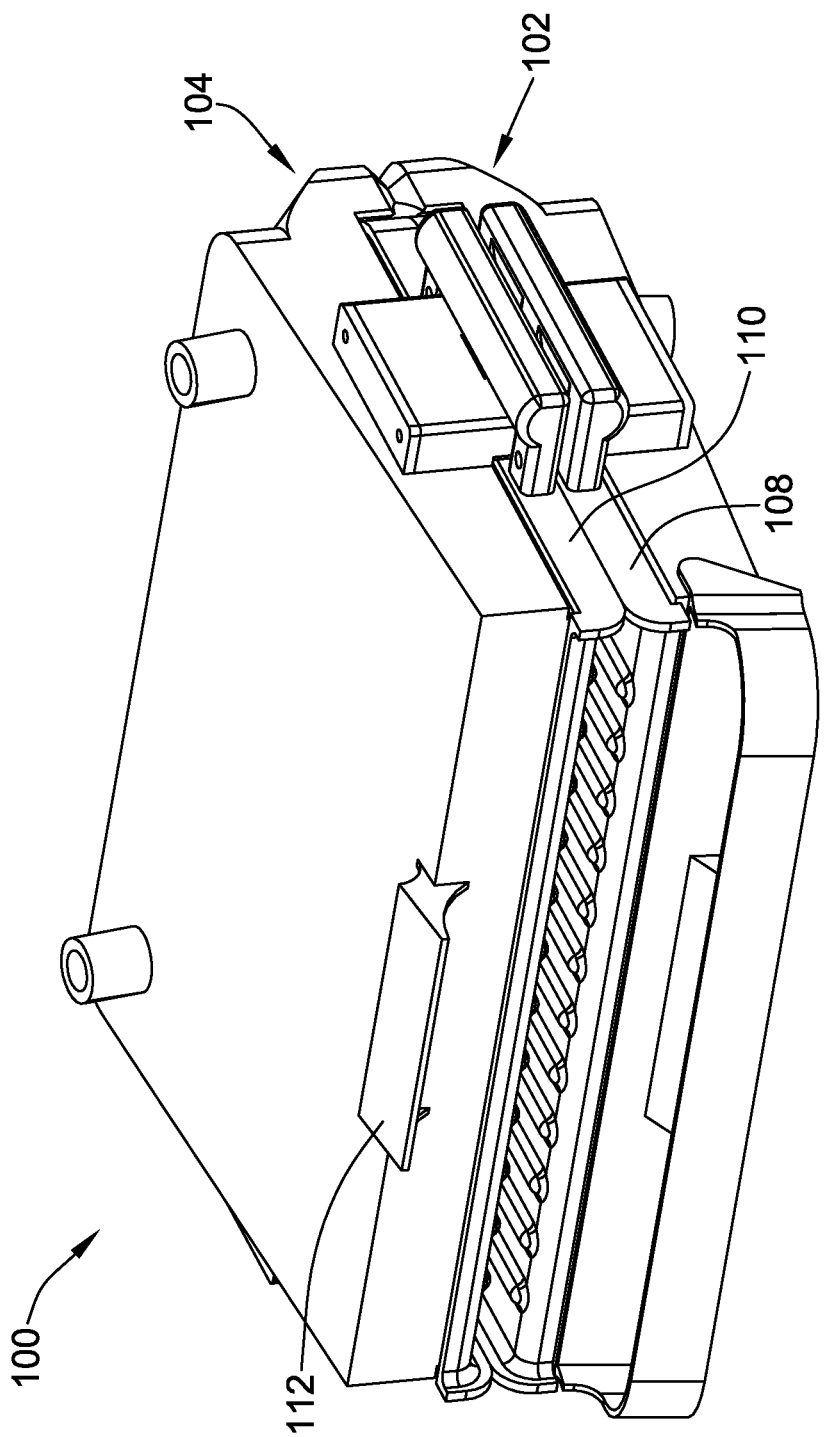
FIG. 1 is a perspective view of one embodiment of a tabletop grill.
Figure 2:
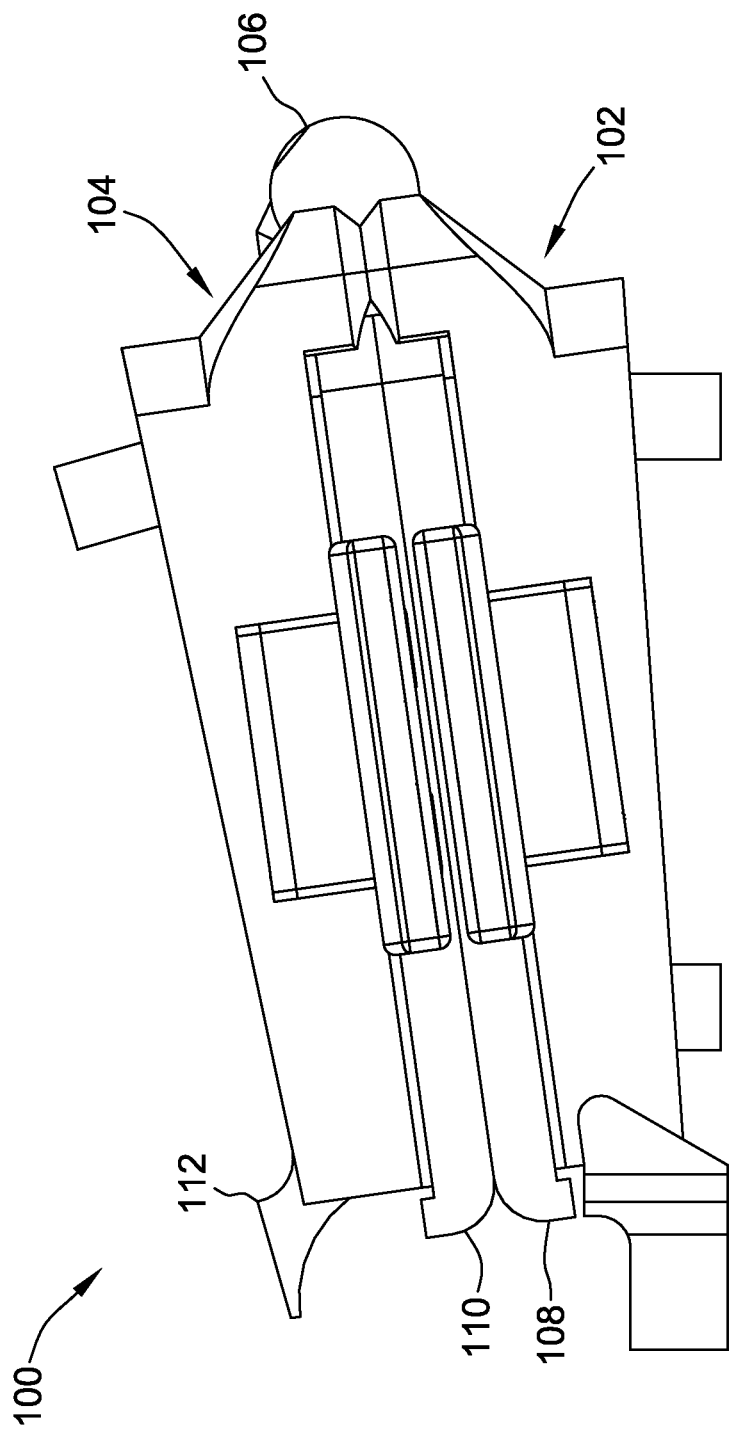
FIG. 2 is a side view of the tabletop grill of FIG. 1.
Figure 3:
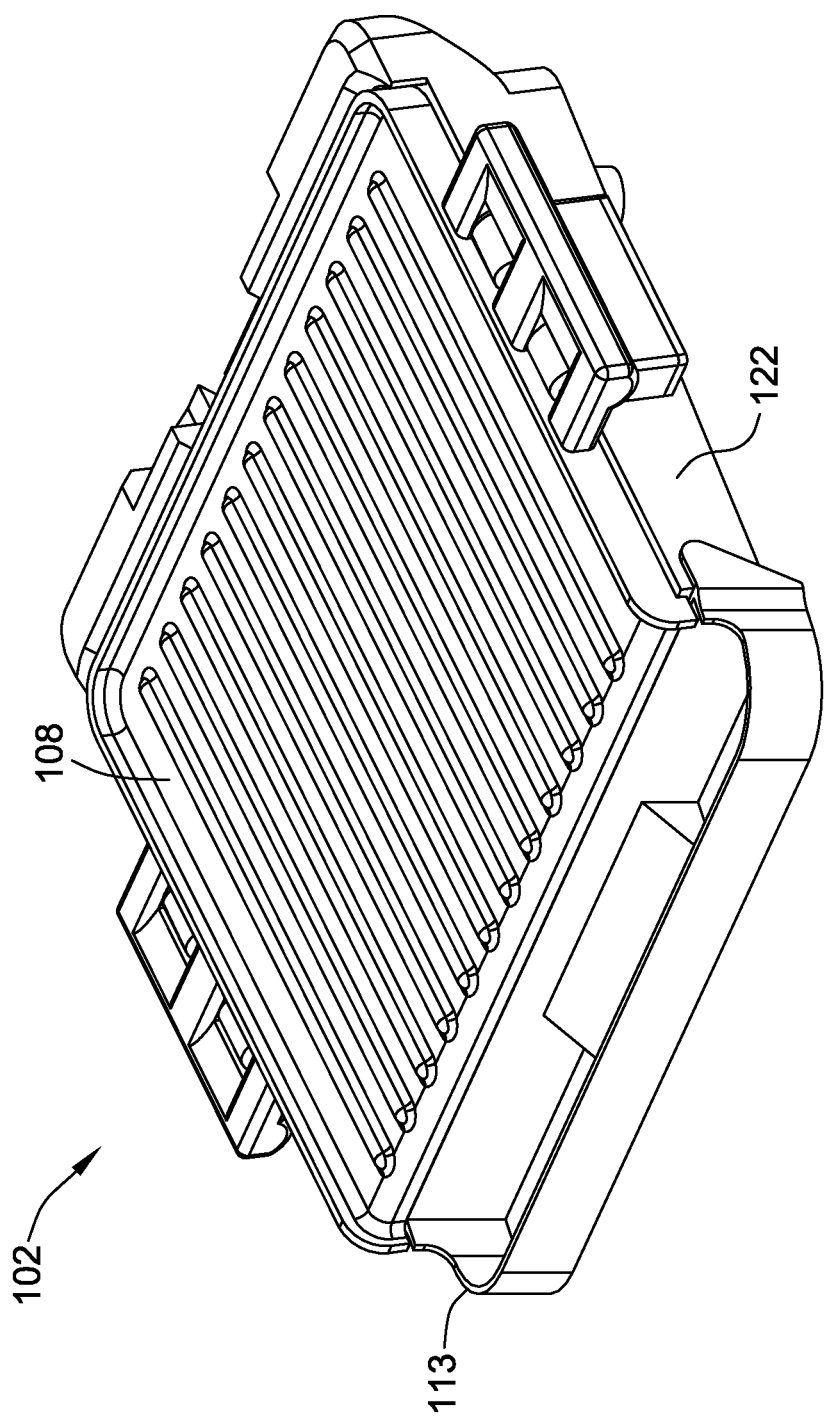
FIG. 3 is a perspective view of a bottom grill unit of the tabletop grill of FIG. 1.
Figure 4:
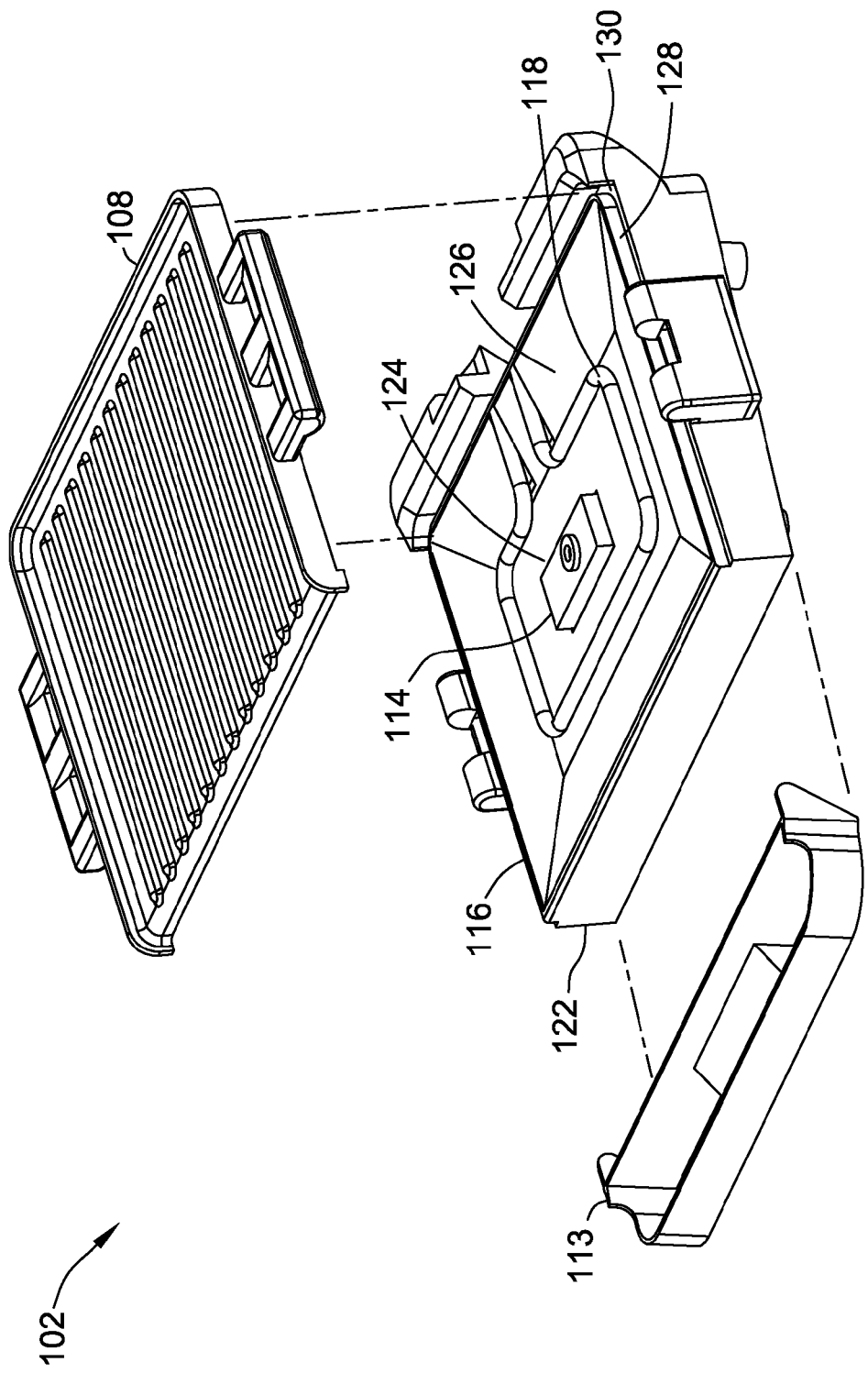
FIG. 4 is an exploded view of the bottom grill unit of FIG. 3.

Referring to the drawings, and in particular to FIGS. 1 and 2, a tabletop grill according to the illustrated embodiment is indicated generally by 100. The illustrated grill 100 comprises a bottom grill unit (indicated generally by 102) and a top grill unit (indicated generally by 104) that are connected together via a hinge 106. The bottom grill unit 102 has a bottom grill plate 108, and the top grill unit 104 has a top grill plate 110. Notably, in other embodiments, the grill 100 may be any suitable tabletop heating appliance that functions as described herein (e.g., a griddle, a waffle iron, etc.).

In the illustrated embodiment, the hinge 106 is configured to enable the top grill unit 104 to be opened and maintained in a position that orients the top grill plate 110 at about 90° relative to the bottom grill plate 108. The hinge 106 is also configured to enable the top grill unit 104 to be pivoted from the position of the top grill plate 110 being oriented at about 90° relative to the bottom grill plate 108 into a position in which the top grill plate 110 is oriented at about 180° relative to the bottom grill plate 108 (e.g., a position in which the grill 100 is open, with the bottom grill unit 102 and the top grill unit 104 both contacting the tabletop or other support surface). For example, in one suitable embodiment, the hinge 106 is configured to maintain the top grill unit 104 in a first open position in which the top grill plate 110 is oriented at about 105° relative to the bottom grill plate 108, and the hinge 106 is further configured to permit pivoting of the top grill unit 104 from the first open position into a second open position in which the top grill plate 110 is oriented at about 196° relative to the bottom grill plate 108. Suitably, other embodiments of the hinge 106 may be configured to enable other desired orientations of the grill plates 108, 110 relative to one another.

In that regard, the illustrated top grill unit 104 is provided with an extension 112 that functions as a handle for lifting the top grill unit 104 away from the bottom grill unit 102 and into an orientation at which the grill plates 108, 110 are angled at about 90° relative to one another, and also functions as a foot for supporting the top grill unit 104 on the tabletop surface (or other suitable support surface) when the grill plates 108, 110 are angled at about 180° relative to one another. Moreover, the illustrated hinge 106 is configured such that the top grill unit 104 is floatable relative to the bottom grill unit 102 within a predetermined distance (e.g., about 1"). Thus, when a thicker food product is placed on the bottom grill plate 108 and the top grill unit 104 is hinged toward the bottom grill unit 102 to close the grill 100, the floatable hinge 106 permits the top grill unit 104 to rise within the predetermined distance in order to better accommodate the thicker food product. The illustrated grill 100 therefore facilitates pivoting the top grill plate 110 relative to the bottom grill plate 108 within a wider range of motion, as well as accommodating thicker food products (e.g., thicker cuts of meat or thicker sandwiches) between the grill plates 108, 110.

As set forth above, the illustrated grill 100 is configured as a horizontal grill (i.e., a device configured to heat a food product with the grill plate(s) 108, 110 oriented substantially parallel to the tabletop or other suitable support surface). However, it is contemplated that the grill 100 may be a vertical grill in other embodiments (i.e., a device configured to heat a food product with the grill plate(s) 108, 110 oriented substantially perpendicular to the tabletop or other suitable support surface). Alternatively, the grill 100 may have only one grill plate (e.g., only the bottom grill plate 108, with no top grill unit 104), or the grill 100 may be configured to heat a food product with the grill plate(s) 108, 110 oriented in any suitable manner.

Referring now to FIGS. 3-8, the bottom grill unit 102 is shown in more detail. However, it should be noted that the top grill unit 104 is to be constructed in much the same manner as the bottom grill unit 102. In the illustrated embodiment, the bottom grill unit 102 includes a thermostat 114, a reflector pan 116, and a heating element 118 that are disposed one atop of the other within a cavity 120 (FIG. 5) of a housing 122 beneath the grill plate 108 such that the heating element 118 is disposed between the reflector pan 116 and the grill plate 108. The thermostat 114 and the heating element 118 are configured to be provided electrical power from a source of electricity in any suitable manner (e.g., via electrical cords plugged into an electrical outlet). The bottom grill unit 102 also includes a grease tray 113 suitably arranged to collect grease during a grilling operation.

The reflector pan 116 is configured to be shallow and has a substantially flat bottom segment 124 and oblique side segments 126 such that heat radiated downward or sideways from the heating element 118 is reflected toward the underside of the grill plate 108 in a more evenly distributed manner, thereby facilitating optimized heating of the grill plate 108. In other embodiments, the heating element 118, the reflector pan 116, the grill plate 108, and/or the thermostat 114 may be suitably configured to optimize heating of the grill plate 108 (e.g., the reflector pan 116 may be contoured in another manner, or the heating element 118 may be positioned in another location).

In the illustrated embodiments, the housing 122 of the bottom grill unit 102 is configured with a lip 128 projecting from a step 130 about at least a portion of the periphery of the cavity 120. Correspondingly, the grill plate 108 is also configured with a lip 132 (FIG. 8) that extends about at least a portion of the plate periphery. When the grill plate 108 is seated on the housing 122, the lip 132 of the grill plate 108 is seated on (or closely adjacent to) the step 130 of the housing 122 such that the lip 132 of the grill plate 108 overlaps the lip 128 of the housing 122 to facilitate retaining (e.g., sealing) heat within the cavity 120 during grilling, thereby providing a more efficient grilling operation (e.g. faster preheating, improved temperature presetting, etc.). In this manner, the bottom grill unit 102 facilitates preheating the grill plate 108 faster; distributing heat along the grill plate 108 in a more even manner; expediting heat recovery and cooking time; and more effectively presetting and maintaining an optimal cooking temperature (e.g., 390° F., 375° F., etc.). In other embodiments, however, the grill plate 108 and the housing 122 may be suitably configured for interacting (e.g., overlapping) with one another in any manner that facilitates retaining heat within the cavity 120 during grilling.

Figure 5:
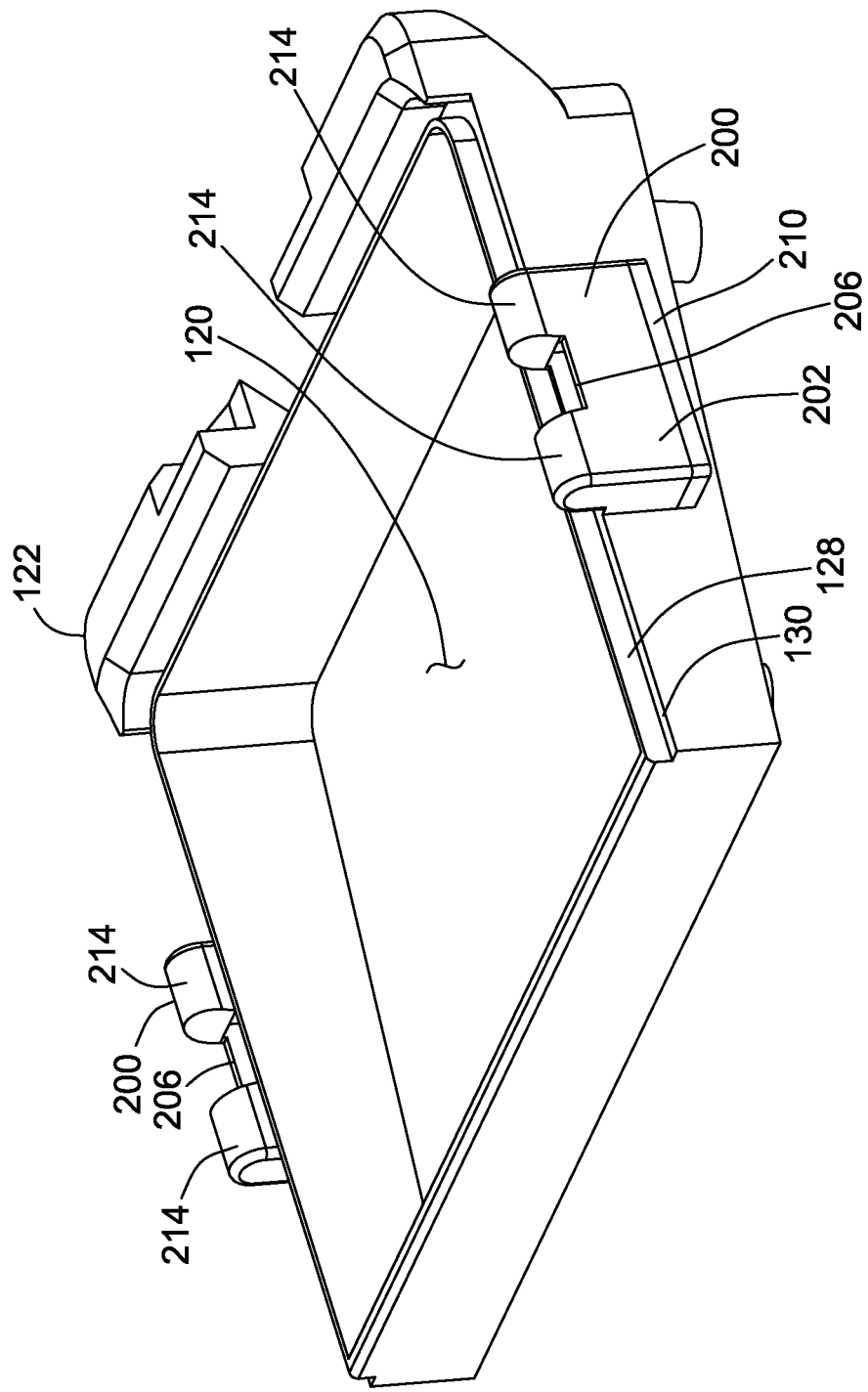
FIG. 5 is a top perspective view of a housing of the bottom grill unit of FIG. 3.
Figure 6:
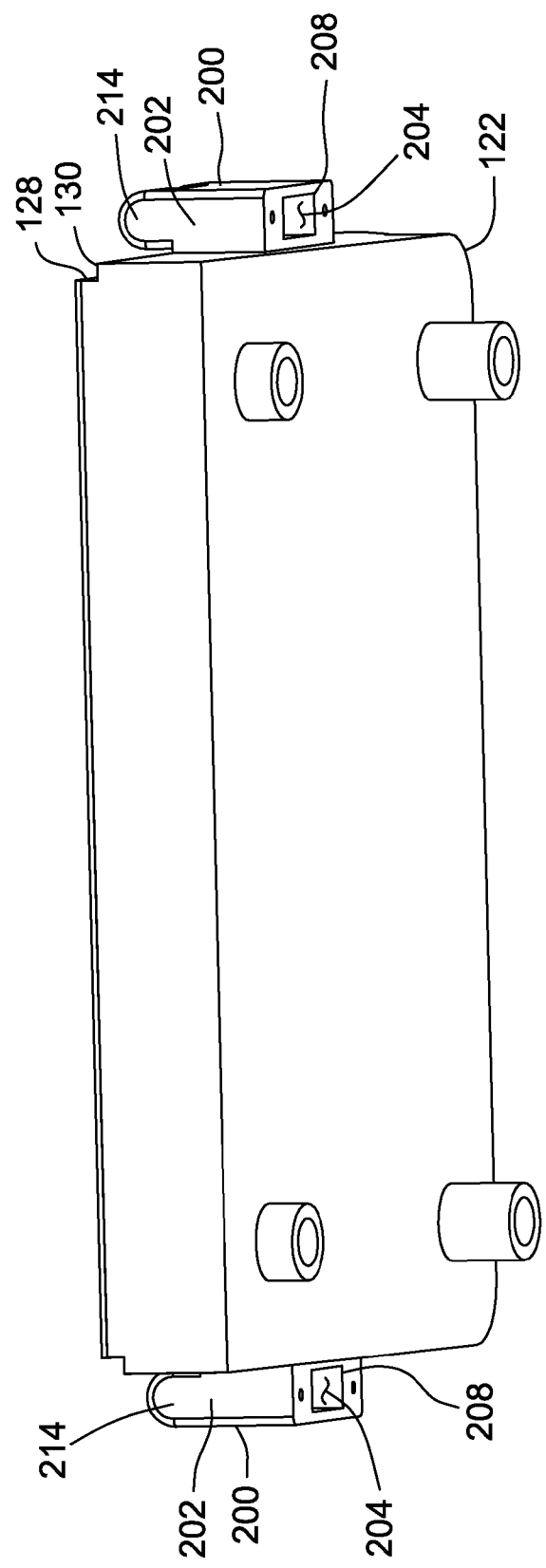
FIG. 6 is a bottom perspective view of the housing of FIG. 5 with a pair of closures detached from their associated sleeves.

With particular reference to FIGS. 5 and 6, the housing 122 further includes a pair of alignment assemblies 200 for removably seating the grill plate 108 on the housing 122. Each alignment assembly 200 includes a rigid sleeve 202 (or shell) defining an internal pocket 204 that has an open top 206 and an open bottom 208. A closure 210 (not shown in FIG. 6) is fastened to the sleeve 202 (e.g., via screws 212 shown in FIGS. 9-11) to cover the open bottom 208, and a pair of spaced alignment projections 214 flank the open top 206. The alignment assembly 200 also includes a magnet device 216 (shown in FIGS. 9-11) situated within the pocket 204, as set forth in more detail below.

Figure 7:
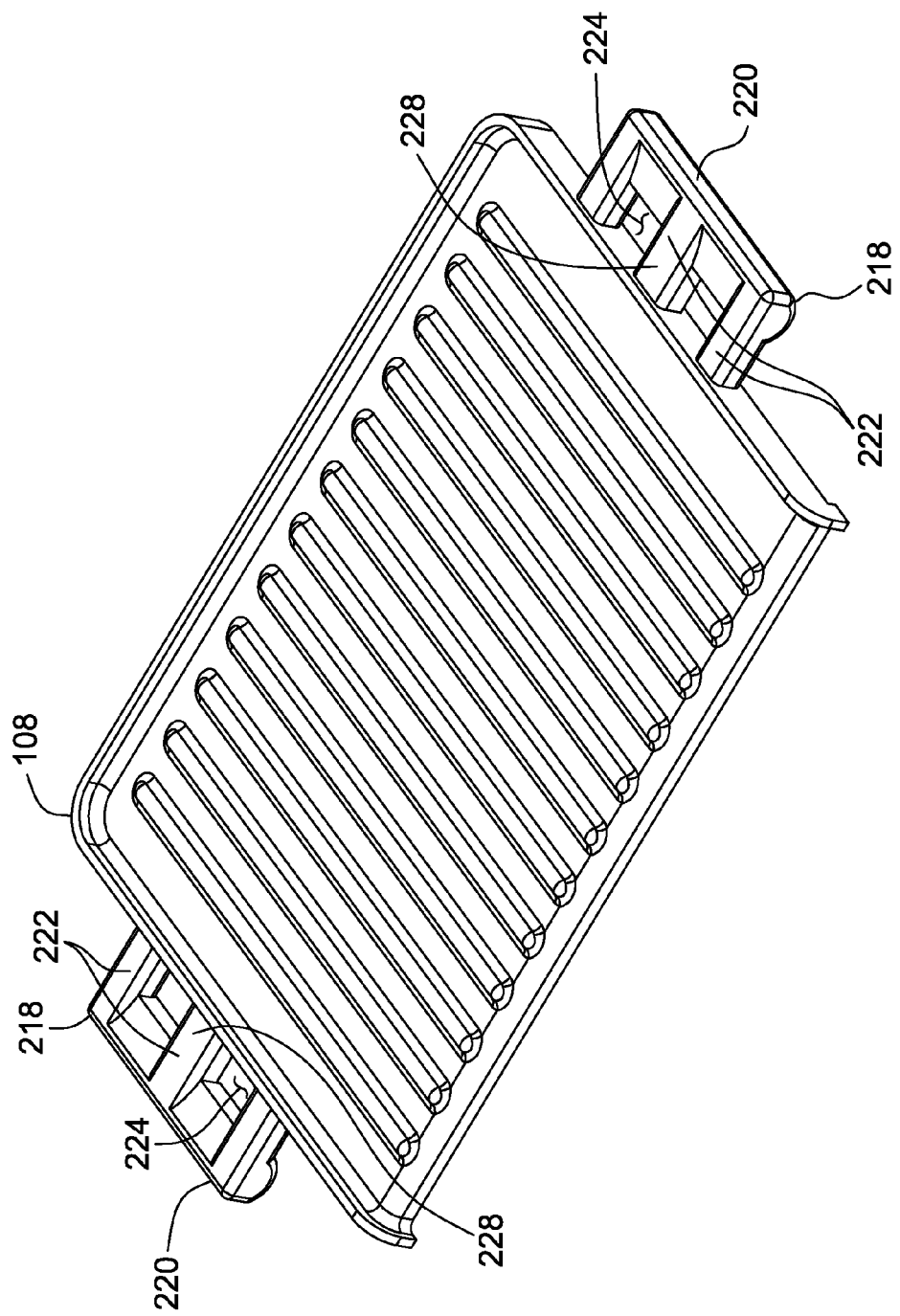
FIG. 7 is a top perspective view of a grill plate of the bottom grill unit of FIG. 3.
Figure 8:
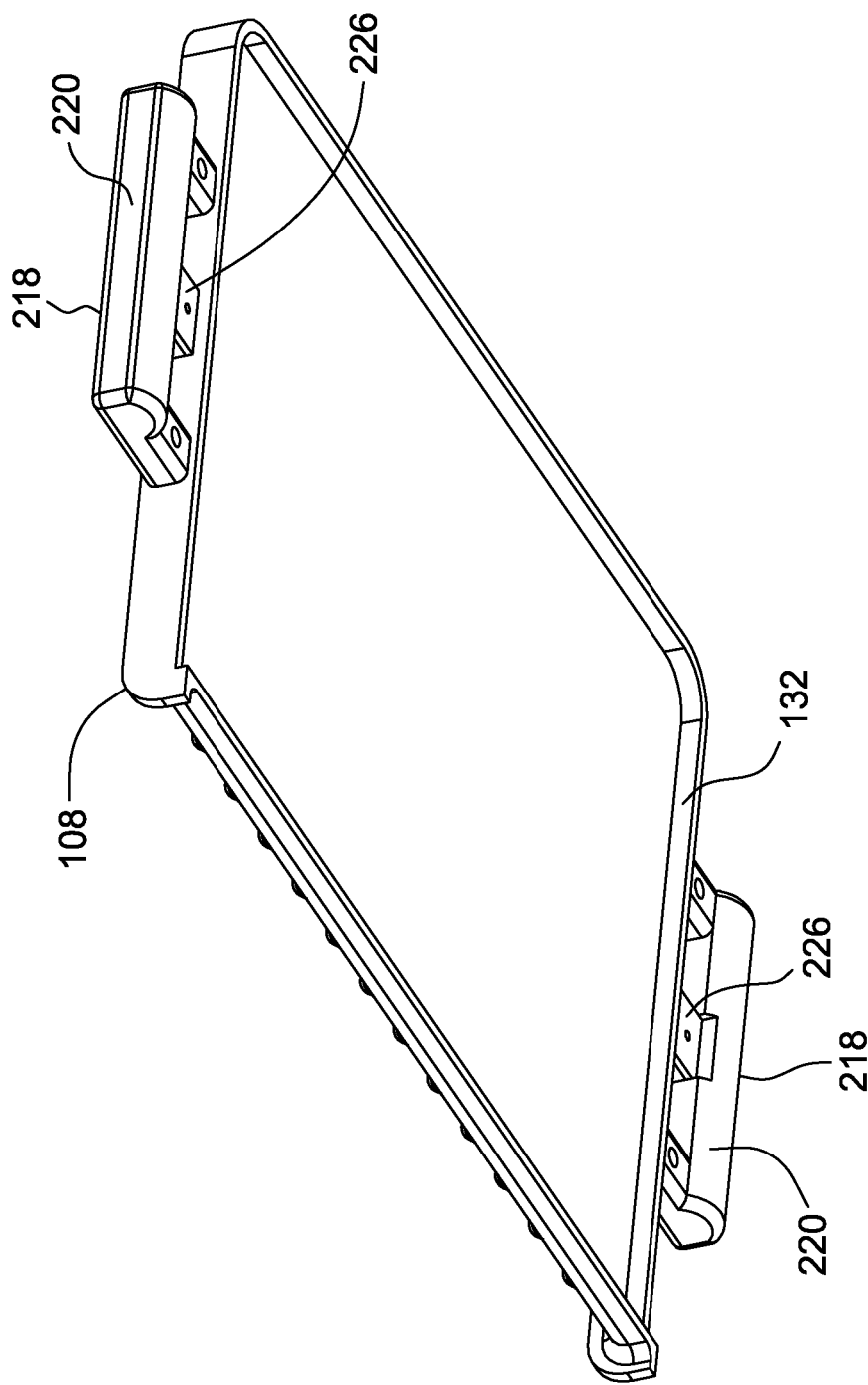
FIG. 8 is a bottom perspective view of the grill plate of FIG. 7.

As shown in FIGS. 7 and 8, the grill plate 108 has a pair of handles 218. Each handle 218 has a gripping segment 220 and three alignment segments 222 extending substantially perpendicular to the gripping segment 220, thereby defining a pair of gaps (or apertures) 224 for receiving the projections 214 of one of the alignment assemblies 200 to properly align the handle 218 (and, therefore, the entire grill plate 108) on the housing 122 when the grill plate 108 is seated on the housing 122. Notably, a ferromagnetic material 226 (e.g., a metallic material) is disposed on an underside of, or within, the middle alignment segment 228 of the handle 218. For example, as illustrated in FIG. 8, the ferromagnetic material 226 may be a metallic plate that is fastened to the underside of a plastic handle 218.

Moreover, with general reference again to FIGS. 1-8, other embodiments of the grill 100 may suitably include: a cord wrapping assembly; dishwasher-safe materials; no handles, integrated handles, or extended phenolic handles; a grill plate coating; a temperature preset device; an optimized grill slope; optimized grill plate rib configurations; or grill plates having optimally sized cooking areas.

Figure 9:
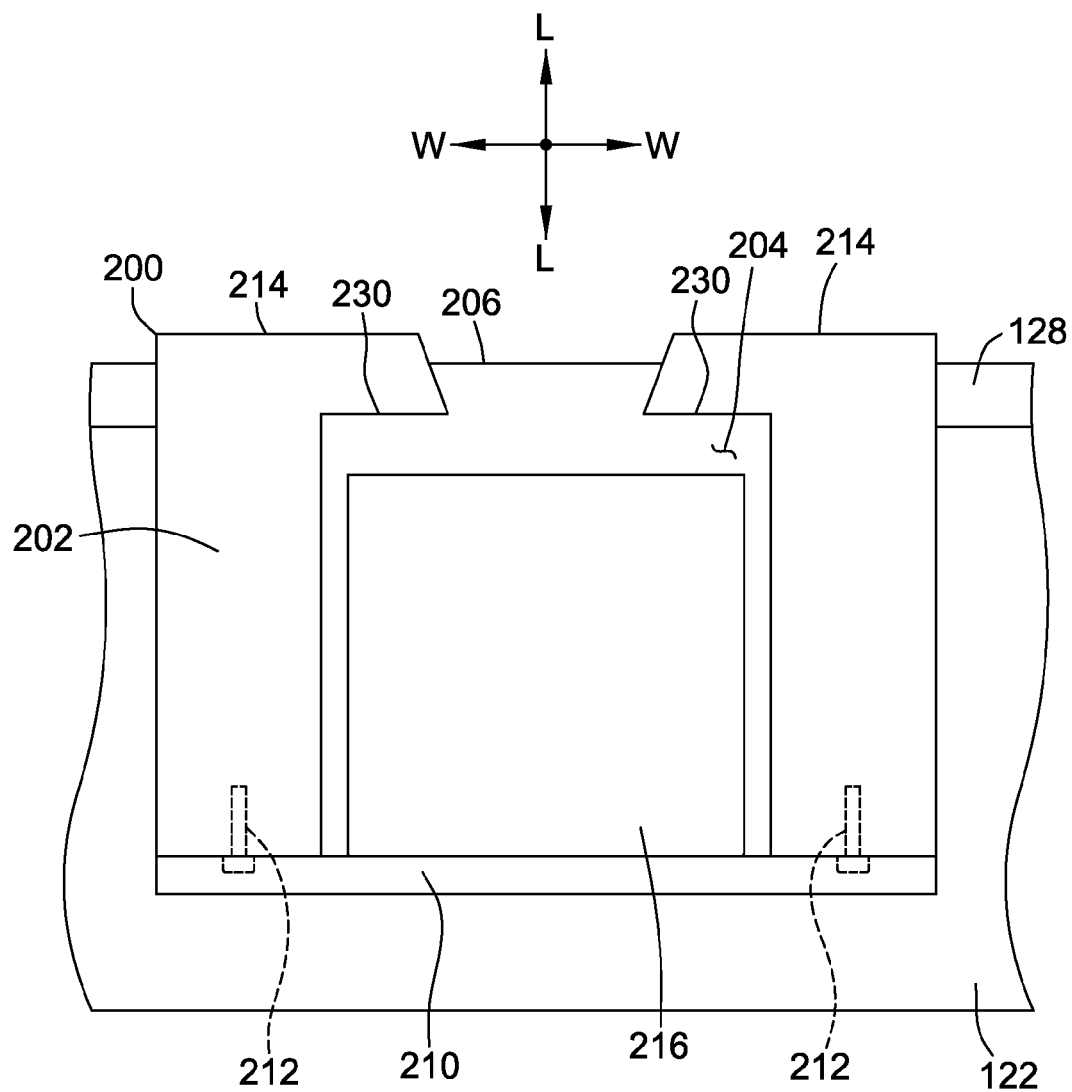
FIG. 9 is a schematic cross-sectional view of a grill plate alignment assembly of the housing of FIG. 5.
Figure 10:
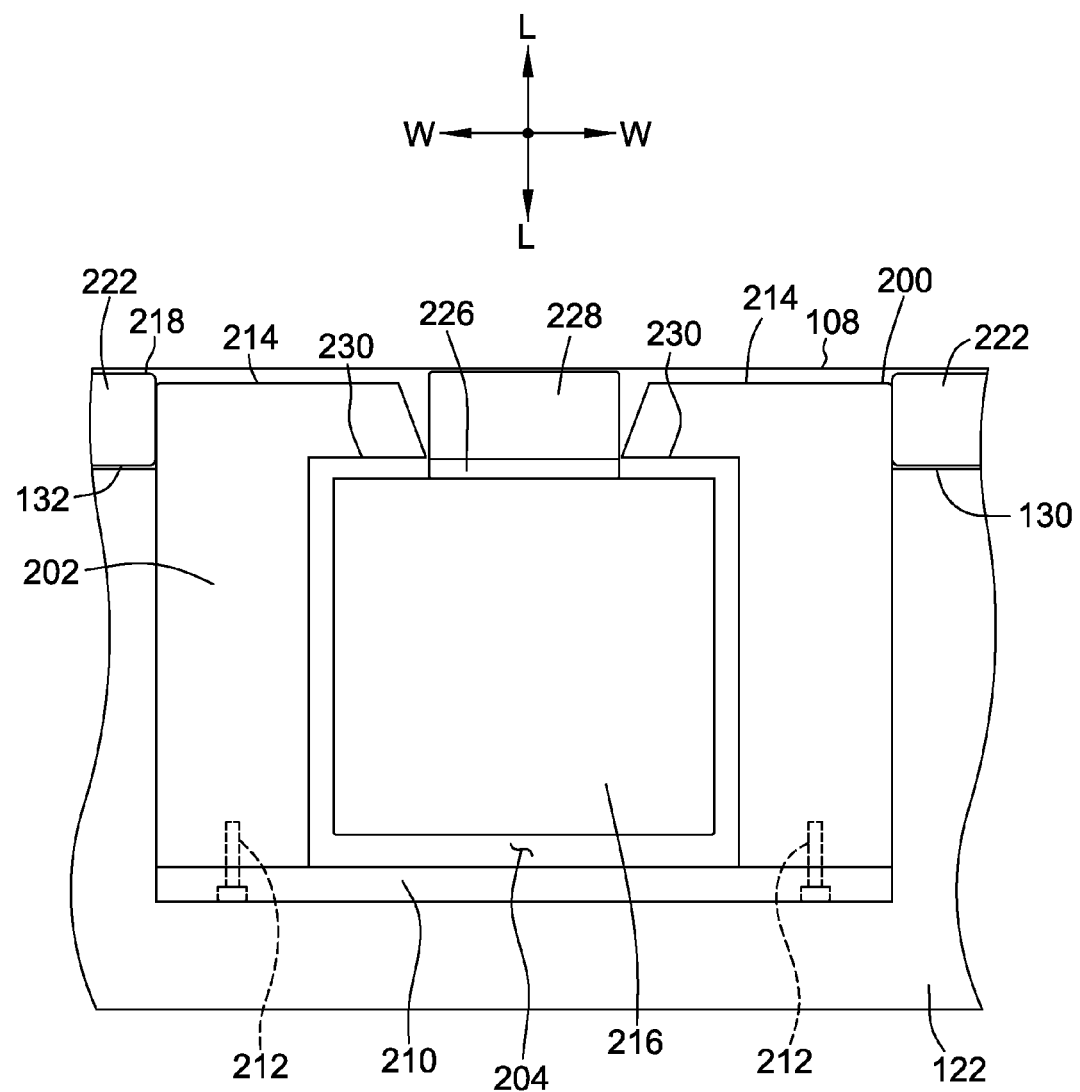
FIG. 10 is a schematic cross-sectional view of the grill plate alignment assembly of FIG. 9 operatively engaged with a handle of the grill plate of FIG. 7.
Figure 11:
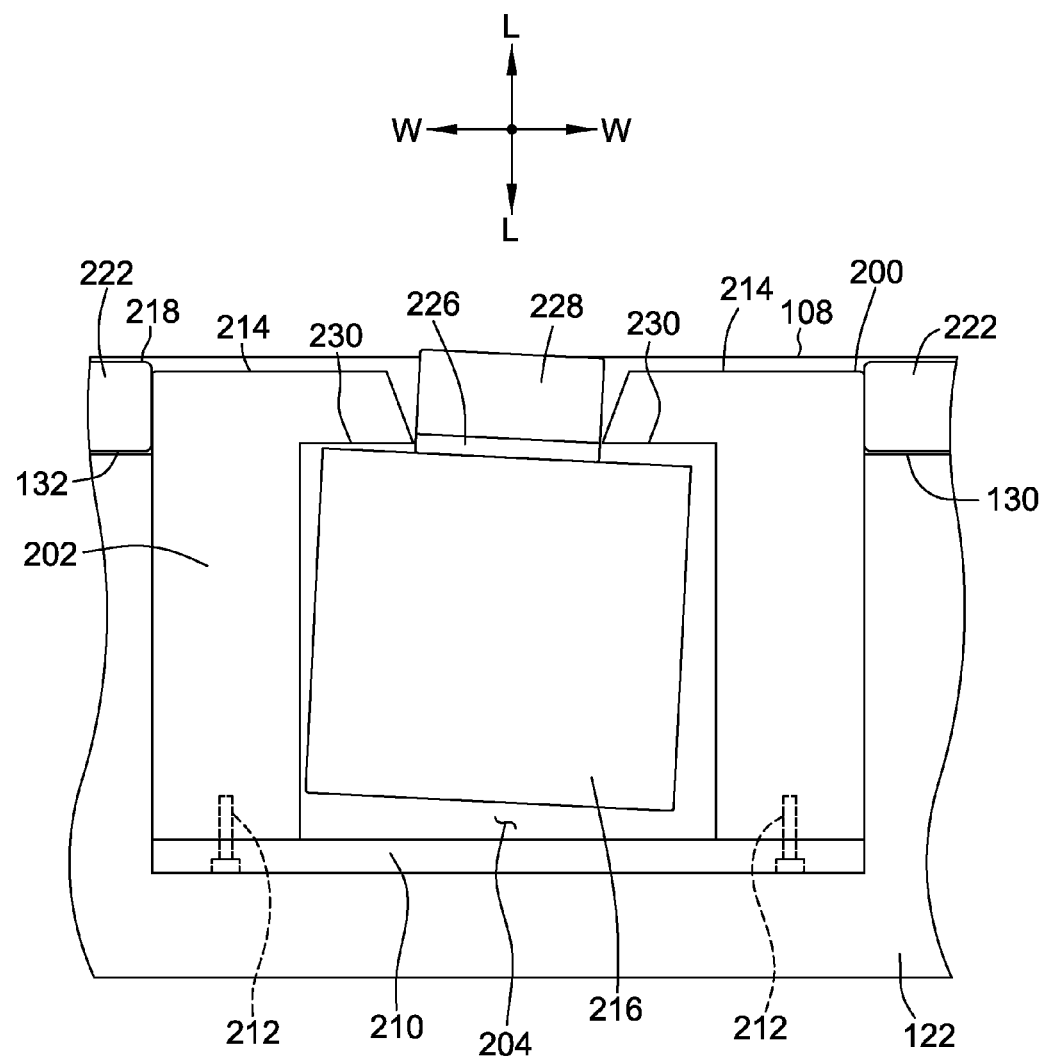
FIG. 11 is another schematic cross-sectional view of the grill plate alignment assembly of FIG. 9 operatively engaged with a handle of the grill plate of FIG. 7.

Referring now to FIGS. 9-11, one of the alignment assemblies 200 is shown in schematic cross-section during its various states of operation.

Before describing the functionality of the illustrated alignment assembly 200, it should be noted that the sleeve 202 has a pair of internal overhang surfaces 230 adjacent the open top 206 (FIG. 9), and the magnet device 216 is disposed within the pocket 204 beneath the overhanging surfaces 230. The pocket 204 has a lengthwise dimension L and a widthwise dimension W. Notably, the magnet device 216 is sized to have a loose fitting disposition within the pocket 204 (e.g., the illustrated magnet device 216 is sized to be movable lengthwise and widthwise within the pocket 204). As set forth below, in some instances, this loose fitting disposition enables a more robust magnetic connection between the associated handle 218 and the magnet device 216 when the grill plate 108 is seated on the housing 122. Suitably, the magnet device 216 may be any object that produces magnetism. For example, in one embodiment, the magnet device 216 may be a magnetic catch made up of a ceramic magnet fastened between two metallic plates such that the ceramic magnet transfers magnetism to the metallic plates, thereby reducing wear on the ceramic magnet by enabling the metallic plates (rather than the ceramic magnet) to be used for contacting the structure to which the magnet device is to be repeatedly coupled (e.g., the handle 218).

With particular reference to FIG. 9, the illustrated alignment assembly 200 is in a first operative state, in which the magnet device 216 is at rest on the closure 210 within the pocket 204 because the grill plate 108 has yet to be mounted on the housing 122. Notably, the magnet device 216 may not necessarily be at rest on the closure 210 in every instance (e.g., the magnet device 216 of the top grill unit 104 may be seated on a sidewall of its associated sleeve 202 when the top grill unit 104 is hinged open at an angle less than 180° with the top grill plate 110 removed).

To mount the grill plate 108 on the housing 122 (as shown in FIG. 10), the gaps 224 of the handle 218 are aligned with the projections 214 of the alignment assembly 200. The handle 218 is then lowered toward the alignment assembly 200 until the projections 214 of the alignment assembly 200 are inserted into the gaps 224 of the handle 218. When the grill plate 108 is fully seated on the housing 122 (e.g., when the lip 132 of the grill plate 108 is seated on the step 130 of the housing 122), the middle alignment member 228 is disposed within the open top 206 of the sleeve 202 such that the middle alignment member 228 (e.g., the ferromagnetic material 226) is at least partially beneath the overhang surfaces 230. As a result, the magnetic attraction between the ferromagnetic material 226 and the magnet device 216 causes the magnet device 216 to be set into motion in the lengthwise dimension L, thereby displacing the magnet device 216 from being at rest on the closure 210 (or any other suitable surface within the pocket 204) to being suspended above (or otherwise further distanced away from) the closure 210 in magnetic connection with the ferromagnetic material 226 of the handle 218.

Because the magnet device 216 is larger (in the widthwise dimension W) than the open top 206 of the sleeve 202, the overhang surfaces 230 act as limit stops for the lengthwise displacement of the magnet device 216, thereby preventing withdrawal of the magnet device 216 from the pocket 204 and, therefore, inhibiting removal of the grill plate 108 from the housing 122 until the magnetic connection between the magnet device 216 and the ferromagnetic material 226 has been broken.

In this manner, the grill plate 108 is mechanically and magnetically stabilized on the housing 122. More specifically, the handles 218 are inhibited from moving laterally (i.e., are inhibited from moving in a plane substantially parallel to the widthwise dimension W of the pocket 204) by virtue of the intersticed arrangement of the alignment segments 222 and the alignment projections 214, and the handles 218 are also inhibited from moving vertically (i.e., are inhibited from moving in a plane substantially parallel to the lengthwise dimension L of the pocket 204) by virtue of the magnetic connection between the magnet devices 216 to their associated ferromagnetic materials 226.

To remove the grill plate 108 from the housing 122, the handle 218 is to be lifted away from the sleeve 202 with a force stronger than the magnetic connection between the magnet device 216 and the ferromagnetic material 226. As a result, the magnet device 216 travels conjointly with the handle 218 in the lengthwise dimension L until the magnet device 216 is stopped by the overhang surfaces 230, at which point the magnetic connection between the magnet device 216 and the ferromagnetic material 226 will be broken. After the magnetic connection has been broken, the grill plate 108 may be completely removed from the housing 122, and the magnet device 216 returns to its state of rest within the pocket 204 (as shown in FIG. 9). This magnetic connection between the grill plate 108 and the housing 122 facilitates enabling the grill plate 108 to be more easily attached to, and removed from, the housing 122 for cleaning, replacement, etc. In other embodiments, the grill plate 108 may removably mount on the housing 122 via any suitable magnetic configuration (e.g., the handles 218 may include the magnet device 216, the sleeve may include the ferromagnetic material 226, and/or the magnetic connection may be established at a location other than at the handles 218 of the grill plate 108).

As shown in FIG. 11, in some instances, the alignment segments 222 of the handle 218 may become deformed (e.g., bent or twisted) over time, and the orientation of the ferromagnetic material 226 (or other suitable engagement surface for the magnet device 216) may therefore become skewed. In other words, repeated use of the grill 100 may cause the ferromagnetic material 226 (or other suitable engagement surface for the magnet device 216 on the handle 218) to become titled or oblique with respect to the widthwise dimension W of the pocket 204. However, because the magnet device 216 is loosely fitted within the pocket 204 (e.g., is permitted to move in the lengthwise dimension L and the widthwise dimension W), the magnet device 216 is therefore given the tolerance to orient itself within the pocket 204 for a more desirable interface with the handle 218 (and, therefore, a stronger magnetic connection with the ferromagnetic material 226 of the middle alignment member 228). This self-orienting capability of the magnet device 216 within the pocket 204 enables the alignment assembly 200 to sufficiently retain the grill plate 108 on the housing 122 even when the orientation of the ferromagnetic material 226 (or other magnet device engagement surface) is skewed.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A tabletop grill comprising:
   a housing;
   a heating element disposed within the housing; and
   a grill plate configured to be removably mounted on the housing, wherein the grill plate and the housing are magnetically connectable to retain the grill plate on the housing, a magnet device mounted on one of the housing and the grill plate, the magnet device being movable relative to said one of the housing and the grill plate.

2. The tabletop grill of claim 1, wherein the other one of said one of the grill plate and the housing comprises a ferromagnetic material for making the magnetic connection.

3. The tabletop grill of claim 2, wherein the grill plate comprises a handle having the ferromagnetic material.

4. The tabletop grill of claim 3, wherein the housing comprises an alignment assembly for aligning the grill plate on the housing by engaging the handle, the alignment assembly including the magnet device.

5. The tabletop grill of claim 4, wherein the handle comprises a gap, the alignment assembly comprising a projection sized for insertion into the gap of the handle.

6. The tabletop grill of claim 4, wherein the handle comprises a plurality of gaps, the alignment assembly comprising a plurality of projections each being sized for insertion into one of the gaps of the handle.

7. The tabletop grill of claim 6, wherein the handle has a gripping member and a plurality of spaced-apart alignment members such that each of the gaps is defined between adjacent alignment members.

8. The tabletop grill of claim 2, wherein the magnet device is movably mounted on the housing and the grill plate comprises the ferromagnetic material.

9. The tabletop grill of claim 8, wherein the housing comprises a sleeve that defines a pocket in which the magnet device is loosely disposed.

10. The tabletop grill of claim 9, wherein the pocket has a lengthwise dimension and a widthwise dimension, the magnet being movable within the pocket in the lengthwise dimension and the widthwise dimension.

11. The tabletop grill of claim 9, wherein the sleeve has an open top through which the magnetic connection is made between the magnet device and the ferromagnetic material.

12. The tabletop grill of claim 10, wherein the sleeve comprises a stop for limiting the lengthwise movement of the magnet device within the pocket.

13. A tabletop grill comprising:
a bottom grill unit comprising a bottom housing, a bottom reflector pan disposed within the bottom housing, a bottom heating element disposed within the bottom housing, and a bottom grill plate mounted on the bottom housing such that the bottom heating element is situated between the bottom reflector pan and the bottom grill plate;
a top grill unit comprising a top housing, a top reflector pan disposed within the top housing, a top heating element disposed within the top housing, and a top grill plate mounted on the top housing such that the top heating element is situated between the top reflector pan and the top grill plate; and
a hinge connecting the bottom grill unit to the top grill unit such that the top grill unit is pivotable relative to the bottom grill unit so as to change an orientation of the top grill plate relative to the bottom grill plate,
wherein each of the bottom grill plate and the top grill plate comprises a pair of handles, each of the handles having a gripping segment, a plurality of spaced-apart alignment segments that define a plurality of gaps, and a ferromagnetic material associated with one of the alignment segments, and
wherein each of the bottom housing and the top housing comprises a pair of alignment assemblies each configured for engaging one of the handles, each of the alignment assemblies having a sleeve, a magnet device loosely disposed within the sleeve, and a plurality of alignment projections projecting from the sleeve each for insertion into one of the gaps of the associated handle such that the magnet device of each alignment assembly magnetically connects to the ferromagnetic material of the associated handle to removably retain each of the grill plates on its respective housing.

\* \* \* \* \*